United States Patent
Ek et al.

(10) Patent No.: US 6,737,611 B2
(45) Date of Patent: May 18, 2004

(54) FLOOR HEATING DEVICE

(75) Inventors: Ulf Ek, Stockholm (SE); Claes-Goran Gustafsson, Varmdo (SE); Kai Kangassalo, Sundsvall (SE)

(73) Assignee: Polyohm AB, Timra (SE)

( * ) Notice: Subject to any disclaimer, the term of this patent is extended or adjusted under 35 U.S.C. 154(b) by 0 days.

(21) Appl. No.: 10/181,715
(22) PCT Filed: Jan. 25, 2001
(86) PCT No.: PCT/SE01/00144
§ 371 (c)(1),
(2), (4) Date: Oct. 18, 2002
(87) PCT Pub. No.: WO01/56333
PCT Pub. Date: Aug. 2, 2001

(65) Prior Publication Data
US 2003/0052114 A1 Mar. 20, 2003

(30) Foreign Application Priority Data
Jan. 28, 2000 (SE) ................................................ 0000293

(51) Int. Cl.$^7$ ................................................ H05B 1/00
(52) U.S. Cl. ........................ 219/213; 219/528; 219/219
(58) Field of Search ................................. 219/213, 544, 219/528, 501, 548, 219; 392/432; 338/31, 22 R; 252/511, 500

(56) References Cited

U.S. PATENT DOCUMENTS

| | | | |
|---|---|---|---|
| 3,858,144 A | | 12/1974 | Bedard et al. |
| 4,764,664 A | | 8/1988 | Kamath et al. |
| 4,967,057 A | * | 10/1990 | Bayless et al. ............. 219/213 |
| 5,380,988 A | * | 1/1995 | Dyer ......................... 219/548 |
| 5,451,747 A | * | 9/1995 | Sullivan et al. ............ 219/528 |
| 5,550,350 A | * | 8/1996 | Barnes ....................... 219/213 |

* cited by examiner

Primary Examiner—Edward K. Look
Assistant Examiner—Vinod D. Patel
(74) Attorney, Agent, or Firm—Dowell & Dowell PC

(57) ABSTRACT

A floor heating bendable, electrically conductive, thermoplastic mat having at least two electrodes arranged along each side edge of the mat. The mat includes a material composition whose volume resistivity increases substantially with an increase of temperature of the material composition below 30° C. The material composition comprises a semicrystalline polymer and an electrically conductive filler material. The polymer has a crystalline melting point which exceeds a normal working temperature of the mat but is below 99° C. and whose softening temperature (Vicat) is in a range of 45–70° C. The mat is self regulating regarding temperature and power for floor heating.

14 Claims, 2 Drawing Sheets

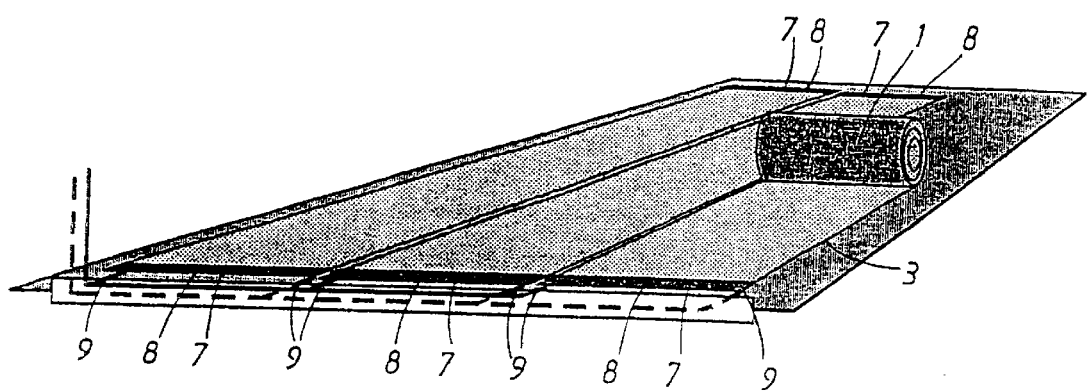
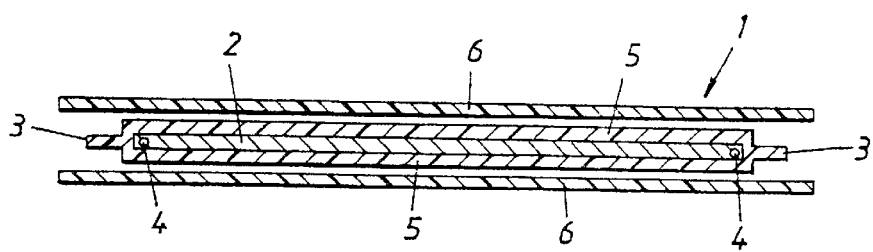

FLOOR HEATING DEVICE

CROSS REFERENCE TO RELATED APPLICATIONS

The above referenced application is based on PCT Application PCT/SE01/00144, filed on Jan. 25, 2001, having the same inventors, which claims priority from Swedish Patent Application No. 0000293-1 which was filed on Jan. 28, 2000 also having the same inventors.

BACKGROUND OF THE INVENTION

1. Field of the Invention

The present invention concerns a device for floor heating comprising a bendable, electrically conductive, thermoplastic mat, adapted for division into lengths and mounting of these lengths side by side underneath a floor and provided with at least two electrodes arranged along each side edge of the mat, to which electrodes a current is connectable, whereby the current is conducted through the device, which heats up and emits heat and whereby the mat comprises a material composition whose volume resistivity increases when the temperature of the material composition increases.

2. Description of the Related Art

Previously known devices for floor heating, "Step warmfloor" and "EP-värmegolv", comprises a heat mat, stored in a coiled up position, of an electrically conductive, thermoplastic material wherein the volume resistivity progressively increases with the temperature. This phenomena is called, in the art, Positive Temperature Coefficient (PTC). The heat mat comprises two electrodes extending along the edges to which a current may be connected, which is conducted through the heat mat and causes a heating of the mat. When the volume resistivity for the material increases with increased temperature, the resistance in the heat mat increases which in turn causes the power to decrease and thereby also the temperature even though the voltage is constant. The heat mat is cut into preferred lengths, connected electrically to each other and mounted side by side underneath a floor.

A problem with the heat mat of "Step Warmfloor" and "EP-värmegolv" is that it may only be driven by low voltage. In their cases the working voltage is 24 V. That means that at least one transformer is needed and the electrodes must comprise braided copper threads to be able to supply the mat with sufficient amount of current.

Another problem with the heat mats of "Step Warmfloor" and "EP-värmegolv" is that the material making up the mat does not increase its volume resistivity pronouncely until the material reaches about 55° C. This brings about a risk of too hot floors, especially if the floor is covered by a matress or a thick carpet, whereby for example a child may get burnt when the matress or carpet is removed. Additionally, wooden floors dry out and will be damaged by too high temperatures. In other words the heat mats of "Step Warmfloor" and "EP-värmegolv" are not self regulating regarding temperature and power in the temperature range which is commonly applicable for floorheating. The heat mats of "Step Warmfloor" and "EP-värmegolv" are used without insulation.

SUMMARY OF THE INVENTION

An object of the present invention is to provide a device for floorheating, which may be driven by mains voltage.

Another object of the present invention is to provide a device for floor heating which is self regulating for temperatures suitable for floor heating i.e. that the volume resistivity increases pronouncely at these temperatures, which also results in an overheating protection.

A further object of the present invention is to provide a device for floor heating, which quickly and easily may be installed.

These objects are met with a device according to the preamble, which is characterised in that the electrodes are threadlike and that the material composition comprises a semicrystalline polymer, whose crystalline melting point exceeds the normal working temperature of the device but is below 99° C. and whose softening temperature (Vicat) is in the range of 45°–70° C., and an electrically conductive filler material, which results in that the device may be driven by mains voltage and that the volume resistivitiy of the material composition substantially increases already at temperatures below 30° C., whereby the device is self regulating regarding temperature and power at normal working temperatures for floor heating.

Similar devices have been on the market for some time but never for another use except for low voltage. The understanding of making an electrically conducting material for mains voltage, which at the same time is self regulating for temperatures suitable for floor heating serves as a basis for the invention.

The semicrystalline material may be a copolymer, for example an ethylene-ethyl acrylate polymer (EEA), ethylene-butyl acrylate polymer (EBA), ethylene-methyl acrylate polymer (EMA), ethylene-vinyl acetate polymer (EVA) or a so called plastomer. Preferably, the crystalline melting point should be in the range of 75–99° C. or rather in the range of 80–96° C. and the electrically conductive filler material should be carbon black.

The mat may be provided with a fully covering electrically insulating layer so that the device is ready to be used without further insulation or any risks of electric flash-over. Preferably the electrically insulating layer is coextruded with the electrically conductive mat, but may also be provided in other ways, such as foliating.

The electrically insulating layer may, for example, be a low density polyethylene (LDPE), linear low density polyethylene (LLDPE), polypropylene (PP), polyester or any of the previously mentioned copolymers, which preferably should have a higher melting point than the semicrystalline material of the mat. Also some plastomers are conceivable. The electrically insulating layer may comprise a plurality of layers of different materials, which may have different purposes, for example an inner layer for good adhesion to the mat, a middle layer for building up a thickness and an outer layer for better scrath resistance, for example, firmly attached to each other. Preferably, electrically insulating filler material, for example titanium dioxide, chalk or silica, is added in the insulating layer. Also flame retarding materials, such as aluminium tri hydrate and/or magnesium hydroxide, may be added. Both electrically insulating and flame retarding materials yield improved mechanical properties.

In order to easily mount the mat in, for example, concrete or clinkers concrete, the mat may be provided with through holes. These holes may have any shape, for example slot shape or rectangular or circular holes, but ought to be arranged in rows perpendicularly to the extension of the mat so that the current passage between the electrodes will not be disturbed. Preferably the through holes are electrically insulated along their edges.

An advantage of the present invention is that there is not any need for transformers. Another advantage is that less copper is used since a single copper thread or a copper wire is sufficient as an electrode to supply enough of the current at mains voltage. A further advantage is that smaller electrical fuses are required. Overall, the inventive device will therefore be less expensive.

BRIEF DESCRIPTION OF THE DRAWINGS

The invention will now be described in detail in connection with the appended schematic drawings which exemplifies at present preferred embodiments of the invention.

FIG. 1 illustrates installation of a device according to the present invention,

FIG. 2 illustrates in cross section a device according to a first embodiment of the present invention.

DETAILED DESCRIPTION OF PREFERRED EMBODIMENTS

Figure 3:
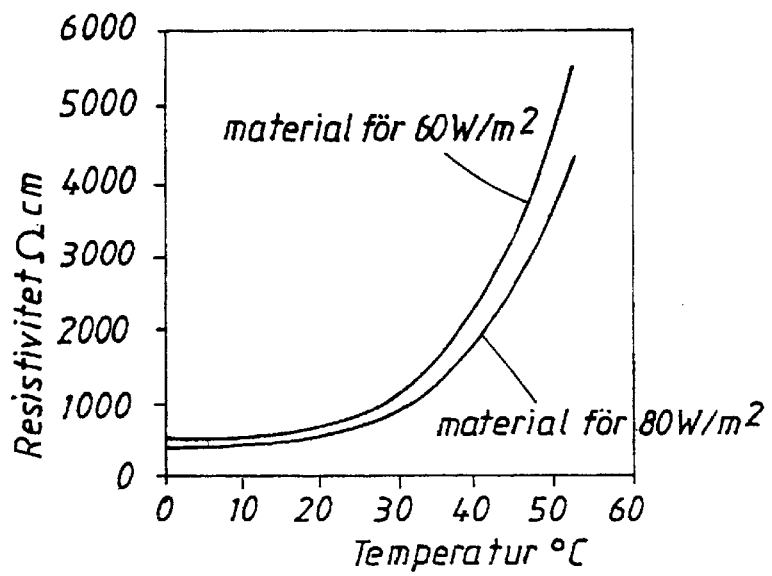
FIG. 3 illustrates with a graph the resistivity at different temperatures for two examples of electrically conducting materials.

As may be seen in FIG. 1 the device for floor heating according to the present invention comprises a thin, bendable, electrically conducting thermoplastic mat 1, which is stored in a coiled manner and is rolled out and cut into a number of lengths when it is to be installed underneath a floor. The material of the mat is very tough and therefore, the mat resists large mechanical abuse.

In FIG. 2 the mat 1 according to a first embodiment of the present invention is illustrated in cross section, which comprises an electrically conducting core 2 of a semicrystalline polymer with an electrically conducting filler material, such as carbon black. The semicrystalline polymer is any of the previously mentioned, whereby plastomers is a family name for a family of homogeneous, ethylene alpha-olefin polymers prepared with metallocene catalysts. Preferably carbon black (soot) is used as an electrically conducting filler material.

There is a large number of different types of carbon black that may be used. Depending on the type of carbon black that is used different percentages is required to achieve the right volume resistivity at 20° C. and so called PTC-characteristics, i.e. that the volume resistivity of the electrically conducting mat material increases with increasing temperature, which causes the resistance in the floor heating device to increase, which in turn brings the power down and therefore also the temperature in the floor heating device.

Along the edges 3 of the mat 1, thread like electrodes 4 are embedded in the core 2, at least one along each edge 3. Preferably the electrode 4 is a tin coated copper thread or copper wire.

Exterior of the electrically conducting core 2 of the mat 1 is a fully covering electrically insulating layer 5 provided. Different countries may have different requirements of the minimum requisite thickness of the electrically insulating layer around electrically conducting products. To maintain the flexibility of the mat 1, in the case a thick layer is required, a thinner layer 5 may be arranged on the conducting core 2 and at installation an extra, loosely engaged, layer 6 may be arranged on top and underneath the mat 1.

From the graph in FIG. 3 it is shown that the volume resistivity in a material for 60 W/M$^2$ at a temperature of 20° C. is about 700 Ωcm but as high as about 1200 Ωcm at a temperature of 30° C.

During compounding of the semicrystalline polymer and the electrically conductive filler material, preferably also small amounts of antioxidants are added, which gives the prepared compound, and therefore the device according to the present invention, good long-time ageing stability.

The floor heating device should be thin so that the floor will not build-up too high, which may cause problems with, for example, the use of existing door steps/thresholds. The thickness of the core ought to be within the range 0.5–2 mm and preferably 1 mm.

Figure 4:
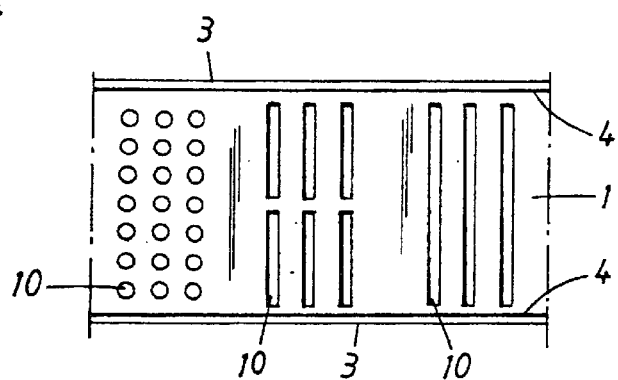
FIG. 4 illustrates different examples of through holes of a second embodiment of the present invention.

A second embodiment of the floor heating device according to the present invention differs only from the previously described embodiment in that through holes 10 are made in the mat 1. As can be seen in FIG. 4 three examples are shown, i.e. perpendicular slots, which almost extend all of the distance between the electrodes 4, two perpendicular, aligned slots, which together almost extend all of the distance between the electrods 4 or a number of smaller holes with, for example, rectangular or circular shape in rows perpendicular to the extension of the mat. Of course, these holes 10 may have any shape, but should be narrow in the direction of the extension of the mat and arranged in rows perpendicular to the extension of the mat so that the current conduction between the electrodes is disturbed as little as possible. The holes 10 is an advantage if the mat 1 shall be moulded into a subfloor, whereby concrete or clinkers concrete penetrate through the holes so that the mat 1 is fixed in position. They also counteract certain waveiness of the mat during manufacturing. Of course the edges of the so introduced holes 10 should be insulated.

Figure 5:
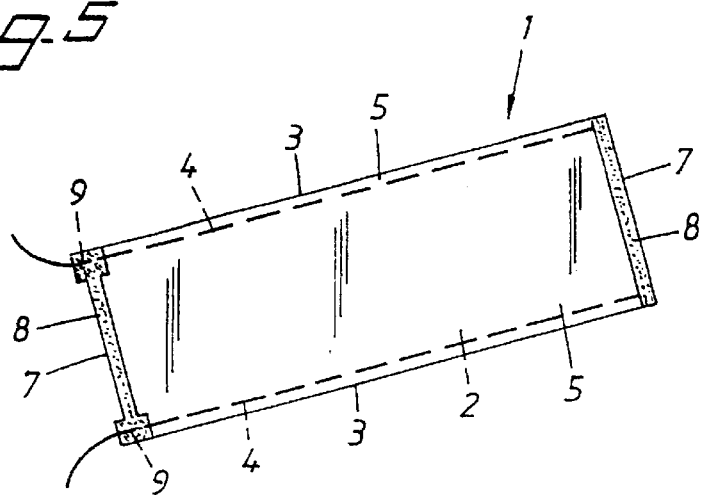
FIG. 5 illustrates a cut piece of a mat according to a first embodiment of the present invention.

In order to install a heated floor by means of the present device the subfloor is measured and a number of lengths of the mat 1 is cut so that the subfloor will be substantially covered when the lengths of mat are mounted side by side. See FIGS. 1 and 5. The cut end edges 7 is electrically insulated by means of insulating tape 8 or the like over the cut end surfaces 7. At one of the end edges 7, preferably at the same end of the floor for all of the mat lengths, the ends 9 of the electrodes are laid open, whereafter the mat lengths are mounted side by side, not overlapping, on top of the preferably insulated subfloor. Each mat lengths is connected in parallel to mains voltage, whereby each connection of the ends 9 of the electrodes of course must be insulated. Thereafter, extra insulation, step sound damping material, filling material and/or the like may be arranged before the floor is laid thereon.

According to a variant of the device according to the invention, a cellular plastic of a thickness of 1–5 mm is arranged at the bottom side of the mat, for example by means of an adhesive, to achieve insulation from the subfloor and increase the step sound damping.

If an electromagnetic shielding of the electromagnetic field arising when using the floor heating device is desired, a metal film, for example, such as an aluminium film, may be arranged between the floor heating device according to the invention and the floor arranged thereon. The metal film is connected to earth. According to another variant of the device of the invention the metal film is provided on the top side of the mat, for example by means of an adhesive, which is preferably an adhesive which is strippable so that the end may be sealed by means of an insulating tape or the like.

As a conclusion an actual example will be illustrated, which shall not be seen as a limitation of the scope, but only as one possible embodiment of many conceivable embodiments within the scope of claim 1. A conceivable floor heating device according to the present invention comprises an electrically conductive core of the semicrystalline polymer, ethylene-butyl acrylate (EBA) with 17% butyl acrylate (BA) as a matrix, which polymer has a crystalline melting point at about 95° C. Into this semicrystalline polymer carbon black of the type N774, about 36–40 percantage by weight, is mixed to achieve an electrically conductive property in the material and so called PTC-characteristics.

The electrically conductive core has a thickness of 1 mm and a width of 38 cm. An exterior electrically insulating layer is coextruded with the electrically conductive core to a thickness of 0.4 mm on each side of the electrically conductive core. The electrically insulating layer comprises an inner layer of ethylene-ethyl acrylate polymer (EEA) with a ethyl acrylate percentage of 12% and an outer layer of polyester and chalk as electrically insulating filler material in the inner layer of EEA. Two threadlike electrodes, one along each side edge of the mat, are embedded in the electrically conductive core. The cross section area of the electrodes are about 0.5 mm². Antioxidants are also added. On top of the floor heating device an aluminium film is provided and underneath a cellular plastic is provided.

What is claimed is:

1. A device for floor heating comprising a bendable, electrically conductive, thermoplastic mat (1), adapted for division into lengths and mounting of these lengths side by side underneath a floor, the mat including at least two electrodes (4) arranged along each side edge (3) of the mat (1) which are connectable to thereby provide current through the mat such that the mat emits heat, the mat (1) including a core formed of a material composition whose volume resistivity increases with an increase of temperature of the material composition, the electrodes (4) are threadlike and the material composition comprises a single semicrystalline polymer and an electrically conductive filler material, the semicrystalline polymer being selected from a group of polymers consisting of an ethylene-ethyl acrylate polymer, ethylene-butyl acrylate polymer, ethylene-methyl acrylate polymer, ethylene-vinyl acetate polymer and a plastomer, whose crystalline melting point exceeds a normal working temperature of the device and are below 99° C. and whose softening temperature is in the range of 45–70° C., the material composition being powered by mains voltage and the volume resistivity of the material composition substantially increases at temperatures below 30° C., whereby the device is self regulating regarding temperature and power for floor heating.

2. A device according to claim 1, wherein the crystalline melting point is in a range of 75°–99° C.

3. The device of claim 2 wherein the crystalline melting point is in a range of 80°–90° C.

4. A device according to claim 1, wherein the semicrystalline material is a copolymer.

5. A device according to claim 1, wherein the electrically conductive filler material is carbon black.

6. A device according to claim 1, wherein the mat (1) is provided with a fully covering electrically insulating layer (5).

7. A device according to claim 6, wherein the electrically insulating layer (5) is co-extruded with the electrically conductive mat (1, 2).

8. A device according to claim 7, wherein electrically insulating filler material is added to the insulating layer (5).

9. A device according to claim 6, wherein the mat (1) is provided with through holes (10).

10. A device according to claim 9, wherein the through holes (10) have a shape selected from a group of shapes consisting of slots, rectangular holes and circular holes.

11. A device according to claim 9, wherein the through holes (10) are electrically insulated along their edges.

12. A device according to claim 1, wherein the mat (1) is provided with through holes (10).

13. A device according to claim 12, wherein the through holes (10) are electrically insulated along their edges.

14. A device for floor heating comprising a bendable, electrically conductive, thermoplastic mat (1), adapted for use underneath a floor, the mat including at least two electrodes (4) arranged along each side edge (3) thereof which are connectable to a source of mains power to thereby provide current to the mat so that the mat emits heat, the mat includes a core formed of a material composition whose volume resistivity increases with an increase of temperature of the material composition, the material composition including a single semi-crystalline polymer or copolymer and an electrically conductor filler material, the semi-crystalline polymer of copolymer having crystalline melting point which exceeds a working temperature of the device but is below 99° C. and whose softening temperature is in a range of 45°–70° C. and wherein the volume resistivity of the material composition substantially increases at temperatures below 30° C., whereby the device is self regulating regarding temperature and power for floor heating.

* * * * *